(12) United States Patent
Poornachandran et al.

(10) Patent No.: US 9,152,819 B2
(45) Date of Patent: Oct. 6, 2015

(54) CLOUD BASED REAL TIME APP PRIVACY DASHBOARD

(75) Inventors: Rajesh Poornachandran, Portland, OR (US); Selim Aissi, Menlo Park, CA (US); Gyan Prakash, Beaverton, OR (US); Saurabh Dadu, Tigard, OR (US); Ravikiran Chukka, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,613

(22) PCT Filed: Dec. 30, 2011

(86) PCT No.: PCT/US2011/068212
§ 371 (c)(1),
(2), (4) Date: Sep. 27, 2013

(87) PCT Pub. No.: WO2013/101215
PCT Pub. Date: Jul. 4, 2013

(65) Prior Publication Data
US 2014/0289789 A1 Sep. 25, 2014

(51) Int. Cl.
*H04L 29/06* (2006.01)
*G06F 21/62* (2013.01)

(52) U.S. Cl.
CPC .......... *G06F 21/6245* (2013.01); *H04L 63/20* (2013.01); *G06F 2221/2101* (2013.01); *G06F 2221/2141* (2013.01)

(58) Field of Classification Search
CPC .................................................. G06F 21/6245

USPC ............................................................. 726/1
See application file for complete search history.

(56) References Cited

U.S. PATENT DOCUMENTS

| | | | |
|---|---|---|---|
| 2003/0088520 A1 * | 5/2003 | Bohrer et al. ................... | 705/74 |
| 2004/0088295 A1 * | 5/2004 | Glazer et al. ..................... | 707/9 |
| 2004/0176104 A1 * | 9/2004 | Arcens ........................ | 455/456.3 |
| 2008/0080718 A1 | 4/2008 | Meijer et al. | |
| 2009/0132813 A1 | 5/2009 | Schibuk | |
| 2010/0318782 A1 | 12/2010 | Auradkar et al. | |
| 2011/0167474 A1 | 7/2011 | Sinha et al. | |
| 2012/0278830 A1 * | 11/2012 | Khoshgozaran et al. ....... | 725/25 |

OTHER PUBLICATIONS

"International Application Serial No. PCT/US2011/068212, Search Report mailed Jun. 28, 2012", 3 pgs.
"International Application Serial No. PCT/US2011/068212, Written Opinion mailed Jun. 28, 2012", 5 pgs.

* cited by examiner

*Primary Examiner* — Jason K Gee
(74) *Attorney, Agent, or Firm* — Schwegman Lundberg & Woessner, P.A.

(57) ABSTRACT

A method of operating an electronic device comprises detecting access to private information stored in memory of the electronic device. The detecting is performed by a privacy management module downloadable to the electronic device as object code for execution on the electronic device and the access is performed by a client application program. The method further comprises tracking, using the privacy management module, the private information being accessed by the client application program, and reconfiguring the electronic device, using the privacy management module, to change the access to the private information by the client application program according to at least one privacy access policy stored in the electronic device.

28 Claims, 3 Drawing Sheets

CLOUD BASED REAL TIME APP PRIVACY DASHBOARD

PRIORITY APPLICATION

This application is a U.S. National Stage Application under 35 U.S.C. 371 from International Application No. PCT/US2011/068212, filed Dec. 30, 2011, which is hereby incorporated by reference in its entirety.

BACKGROUND

An App is a software application or application program that is downloadable to a mobile device from an App distribution website. Apps are sometimes called Mobile Apps because the receiving or target device is typically a mobile electronic device such as a smartphone, tablet computer, or netbook. Apps may also be downloaded to a less mobile electronic device such as a laptop computer, desktop computer, or television for execution. Apps may be downloaded to perform a variety of functions such as news harvesting, gaming, finding parking, etc. The distribution website or platform is usually operated by the provider or licensor of the operating system of the mobile device (the mobile OS). The distribution platform from where Apps are obtained by users may be referred to as a cloud in reference to cloud computing which provides processing or storage services using electronic systems located remotely from users. The platform or cloud may include devices for storage that may be accessed by users to obtain Apps.

The Apps are usually in the form of executable code or object code in a machine language executable by the mobile device. The Apps may be made available free to a user with limited service or a user may be required to pay a fee to download an App. Regardless of whether or not a fee is required, most Apps regularly collect or access user information from the mobile electronic device that a user would typically consider private. This private information can include, among other things, an address book stored on the mobile device, photos or other media, e-mail, short message service (SMS) text messages, and location information such as global positioning service (GPS) information. This information can be collected by Apps for the purpose of providing targeted content and advertising to the user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As explained previously, mobile electronic devices do not allow a user to monitor access to stored private information. Software application programs are sometimes called "Apps" and are typically designed to run on electronic devices. The inventors have recognized that, among other things, electronic devices such as smartphones and tablet computers don't provide any options for a user to monitor or manage the access by Apps to private information stored in a mobile electronic device. This can be addressed by providing user management of the access to the private information.

Figure 1:
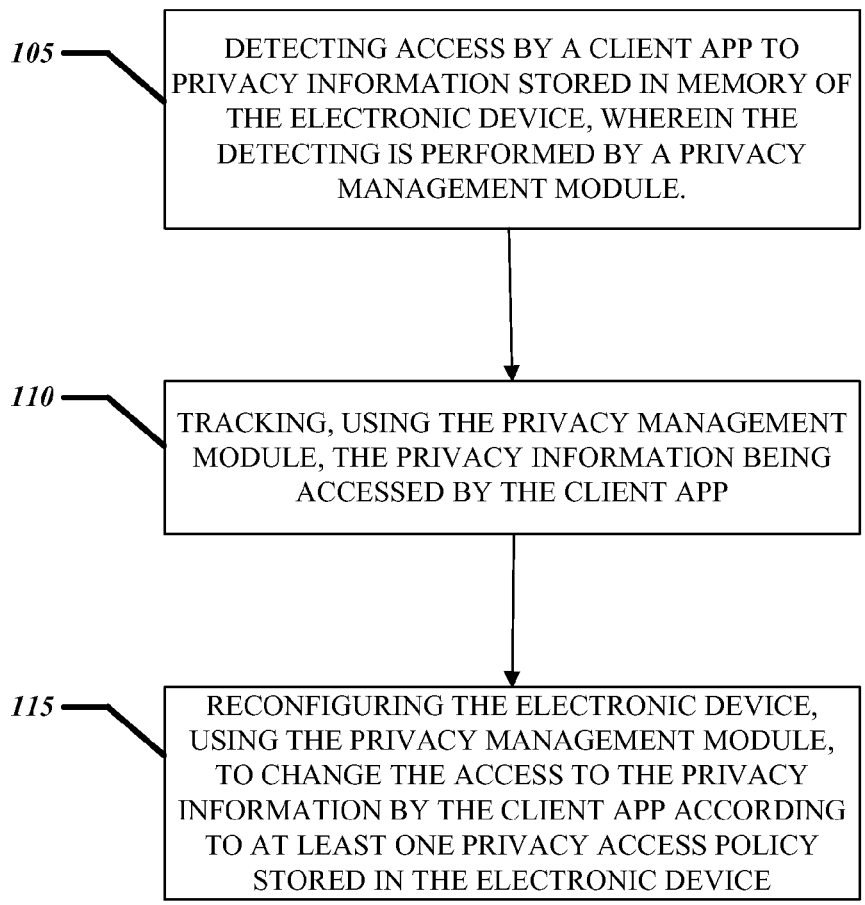
FIG. 1 is a flow diagram illustrating an example of a method 100 of operating an electronic device, according to an embodiment.

FIG. 1 is a flow diagram illustrating an example of a method 100 of operating an electronic device, such as a mobile electronic device. Examples of the electronic device include, among other things, a mobile or cellular telephone (e.g., a smartphone), a tablet computer, a netbook, a laptop computer, and a desktop computer.

At block 105, access to private information stored in memory of the electronic device is detected. The access is performed by a client application program, or client App. The detection is performed by a privacy management module. A module may be software (e.g., object code) or firmware that is executed on a processor of the electronic device, or a combination of one or more of hardware, firmware, and software to perform the functions described. The privacy management module may be downloadable to the electronic device as object code for execution on the electronic device.

At block 110, the private information being accessed by the client App is tracked. The privacy management module may track the access by the client App or a plurality of client Apps in real time when an access occurs or when an attempt to access occurs. In some examples, an access history (e.g., a history file) is prepared by the privacy management module that can include client App information, and the time and date of the access to the stored private information.

At block 115, the electronic device is reconfigured to change access to the private information by the client App according to at least one privacy access policy stored in the electronic device. For instance, one or more client Apps designated by the privacy management module may access only a limited amount of the private information or one or more designated client Apps may be prevented from accessing the private information. In some examples, artificial or fake private information is provided to one or more designated client Apps.

Figure 2:
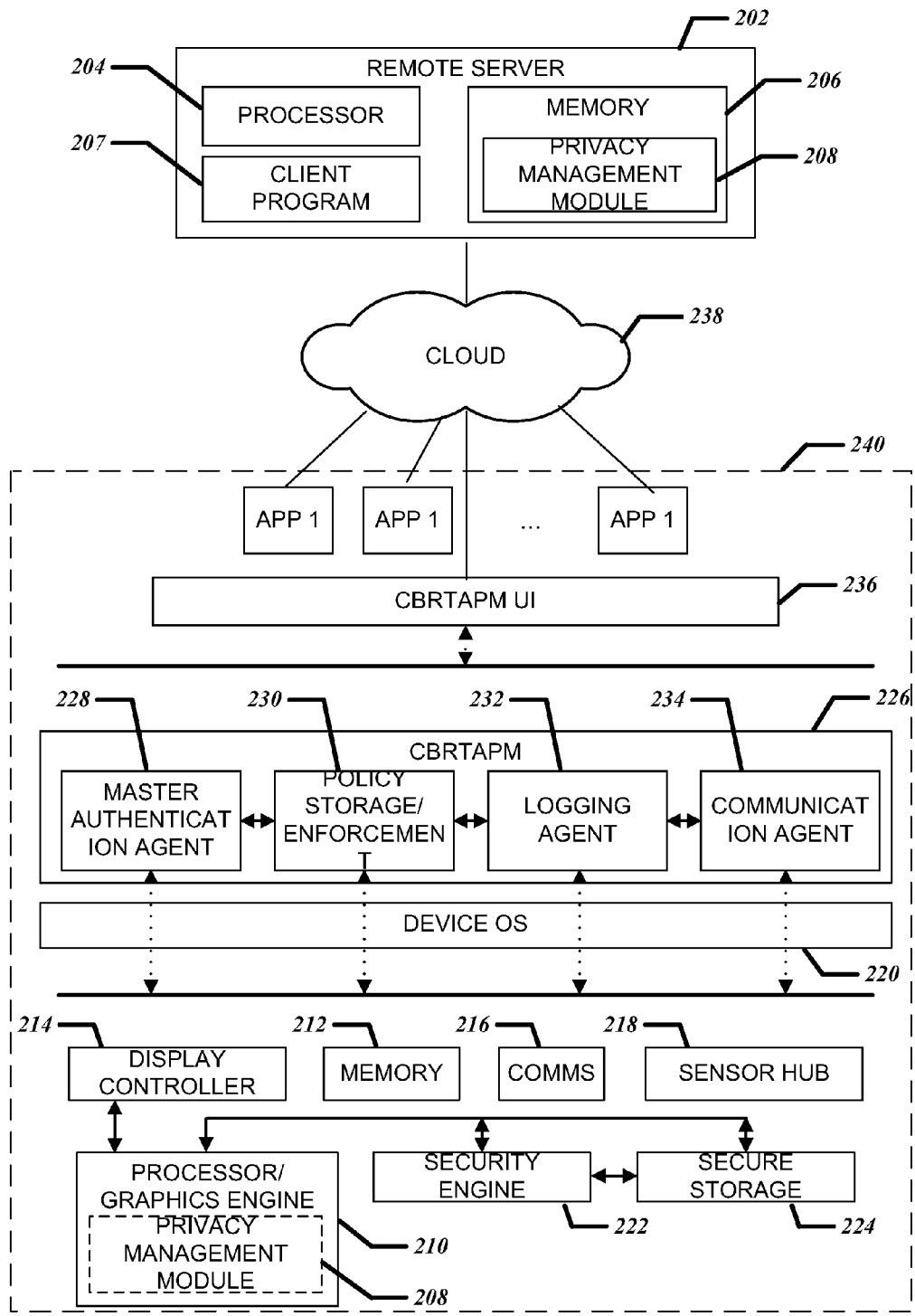
FIG. 2 is a block diagram illustrating portions of an example of a system to manage access to private information stored in one or more electronic devices, according to an embodiment.

FIG. 2 is a block diagram illustrating portions of an example of a system to manage access to private information stored in one or more electronic devices. The system includes a server 202 that is remote from the one or more electronic devices. The server includes a processor 204 and a memory 206. The server 202 can provide a platform as part of a cloud application service from which Apps can be downloaded. In some examples, the server 202 includes a client program 207, executable by the processor of the server 202, to receive requests to download the executable code via a network or cloud 238 to a remote electronic device. The memory 206 stores executable code, including a privacy management module 208. The module includes instructions performable by the electronic device. In some examples, the privacy management module 208 can be downloaded as an App to an electronic device.

The lower portion of FIG. 2 relates to the electronic device. The electronic device includes a processor 210 and memory 212. The processor 210 may include a graphics engine. The electronic device may also include a display controller 214 to provide display capabilities for the device 240. One or more communication modules or Comms 216 provide an interface to communication networks, such as Bluetooth®, 3G, 4G, WiFi®, WiMax®, etc. The electronic device platform may include a sensor hub 218 module to handle input from sensors such as a touch sensor, gyroscopic sensor, thermal sensor, GPS, etc. The electronic device includes an operating system (OS) to provide a software platform. The OS 220 may be, for example, a mobile OS such as iOS provided by APPLE, INC., Android™ provided by GOOGLE, INC., or an OS for another type of mobile device such as Windows® provided by MICROSOFT, INC., Mac® OS X® provided by APPLE, INC., or Linux® provided by Linux® distributors.

The electronic device may also include a security engine 222 and secure storage 224. The secure storage 224 may include tamper proof memory and can include flash memory (e.g., NAND flash memory or MultiMediaCard (MMC) flash memory). The secure storage 224 may store keys for cryptography. The security engine 222 can be hardware-based and may include a second processor transparent to the OS 220. The security engine 222 together with the secure storage 224 provides cryptographic operations and a tamper proof execution environment. The security engine 222 can implement the logic that implements the policies of a user of the electronic device. In the example shown, the processor 210 hosts a downloaded privacy management module 208, but the security engine 222 may host the privacy management module 208 to provide additional system security.

When executing on the electronic device, the privacy management module 208 detects a client App accessing or attempting to access private information stored in the memory 212 of the electronic device. The privacy management module 208 tracks the private information being accessed. Examples of the private information that can be stored in the electronic device were given previously herein. Additional examples of the stored private information include an address (e.g., home or business) of the user, an e-mail address of the user, information regarding an on-line purchase made using the electronic device, the date of birth of the user, the social security number or a portion of the social security number of the user, information related to a financial account, information included in a calendar application of the mobile electronic device, and health information of the user (e.g., medical information, lifestyle information, etc.). In a further example, the private information may include information concerning third party Apps installed on the electronic device (e.g., Apps that are downloaded as a result of "jail breaking" the OS of a smartphone by removing limitations imposed by the manufacturer of the electronic device or by the licensor of the OS).

In some examples, the privacy management module 208 tracks accesses by the client App in real time as the accesses occur. In some examples, the privacy management module 208 performs history tracking and determines accesses after the fact. As explained previously herein, the privacy management module 208 may generate an access history file that can be stored in the secure storage 224 and reviewed at a later time. The privacy management module 208 also reconfigures the electronic device to change the access to the private information by the client App according to at least one privacy access policy stored in the electronic device. The privacy access policy may be stored in the secure storage 224.

To generate access policies, the system in FIG. 2 includes Cloud Based Real Time App Privacy Management, or CBRTAPM 226. The CBRTAPM 226 allows the user to configure privacy access policy to manage behavior of Apps executing on the electronic device. In some examples, the CBRTAPM 226 is invoked as part of services provided by the cloud, and in some examples, the CBRTAPM 226 is invoked and performed on the electronic device. The CBRTAPM 226 may be a software component, and if the CBRTAPM 226 is invoked in the cloud, at least a portion of the CBRTAPM 226 functions can be provided by one or more client programs executing on the server 202. If the CBRTAPM 226 is invoked on the electronic device, the CBRTAPM 226 can be included in the privacy management module 208 executing on the electronic device. The CBRTAPM 226 may be a software component downloaded to the electronic device (e.g., an App) or the CBRTAPM 226 may be installed on the CBRTAPM 226 by the manufacturer or service provider.

In the example shown in FIG. 2, the functions of CBRTAPM 226 are invoked in the electronic device. The CBRTAPM 226 can include an authentication agent 228 subcomponent and a policy storage/enforcement agent 230 subcomponent. The authentication agent 228 can use the security engine 222 to authenticate the user and user devices as an initial check whether the user is authorized to perform the requested actions. The policy storage/enforcement agent 230 manages the access policy. This may include retrieving and storing the policy in the secure storage 224. The policy storage/enforcement agent 230 may also enforce agreements between the user and the services provider, such as whether a user is allowed to run certain Apps under an explicit or implicit license agreement. The CBRTAPM 226 may also include a logging agent 232 subcomponent and a communication agent 234 subcomponent. The logging agent 232 may log all the transactions or accesses by client Apps based on the configured privacy access policy. The communication agent 234 provides secure communication between the electronic device and the remote server 202 such as, for example, by encrypting the communications.

As explained previously herein, the CBRTAPM 226 can be included in the privacy management module 208, and the privacy management module 208 includes instructions to generate the privacy access policy. In some examples, a user interface (UI) or dashboard to the CBRTAPM is provided to facilitate user interaction with the CBRTAPM 226 in developing privacy access policy. The privacy management module 208 includes instructions to display an access privacy policy UI (e.g., a graphical user interface) on the electronic device, such as via the display controller 214. The user may select or enter access policy options into the fields of the UI and input received via the UI is incorporated into the generated privacy access policy.

In FIG. 2, the CBRTAPM UI 236 allows users to configure their privacy access policy and manage the access by Apps running on the electronic device. In some examples, the privacy management module 208 includes instructions to display, via the CBRTAPM UI 236, types of information accessed by the client App. In some examples, the CBRTAPM UI 236 displays the real time privacy data or historic privacy data being accessed by one or more client Apps. This can be useful to the user to identify those Apps that are accessing privacy data to which user is most interested in limiting the access. In some examples, the CBRTAPM 226 generates access policy that limits or prevents access to the private information by the client App. The policy is implemented by the privacy management module 208 using instructions to prevent access to at least a portion of the stored private information according to the privacy access policy. For instance, the privacy management module 208 may include instructions to implement logic generated and stored in the secure storage 224 that prevents access to the private information.

According to some examples, the privacy management module 208 includes instructions to alter the private information provided to the client App according to the privacy access policy. For example, as a result of the access policy generated using the CBRTAPM 226, the privacy management module 208 may return a false name to the App, a false e-mail address to the App, or false GPS coordinates to the App. In the latter case, the user may wish to provide the same GPS coordinates to the App to prevent the App from directing additional advertising to the user's mobile electronic device.

In some examples, the CBRTAPM UI 236 displays a privacy access policy determined according to a licensing agreement associated with a client App (e.g., an implied license agreement resulting from downloading the App or an explicit license agreement). This allows the user to easily compare information being accessed by the client App and any access agreed to by the downloading and use of the App. The user may then develop a privacy access policy that reduces the access to private information by the App but still remains within the licensing agreement. In some examples, the CBRTAPM 226 incorporates licensing information into the privacy access policy. The privacy access policy limits access to the private information according to the licensing information.

As explained previously herein, CBRTAPM 226 can be invoked as part of services provided by the cloud 238. In this case, the privacy access policy can be generated by a client program performing instructions on the remote server 202. The client program of the server is configured to download the CBRTAPM UI 236 to the electronic device or a separate computing device for display to allow the user to access the CBRTAPM. In some examples, the CBRTAPM UI 236 is implemented by downloading and executing a thin client program on the electronic device or a separate computing device. Input entered into the CBRTAPM UI 236 by the user can be communicated to the client program of the server 202 and the client program incorporates input received via the CBRTAPM UI 236 into a privacy access policy generated by the client program. When the privacy access policy configured by the user is generated at the server 202, the privacy access policy can be stored in server memory 206 and can be downloaded at any time by the user into one or more electronic devices. In some examples, the CBRTAPM UI 236 can be used to synchronize activation of the generated privacy access policy in the multiple devices. The activation may be configured to be immediate, on-demand, activated on a periodic basis, etc. Thus, invoking CBRTAPM in the cloud enables the user to generate one privacy access policy for multiple electronic devices. In some examples, privacy access data (e.g., one or more history files) from the multiple electronic devices are collected by cloud based services and presented to the user to use in configuring policy.

When the CBRTAPM 226 is invoked in the cloud, the functions of the CBRTAPM 226 described in regard to FIG. 2 may be split between a client program running on the server 202 and the privacy management module 208 executing on the electronic device. For example, input entered into the CBRTAPM UI 236 by the user can be communicated to the client program 207 using the communication agent 234. The policy storage/enforcement agent 230 may retrieve and store the generated access policy in the secure storage 224 of the electronic device. Some functions of the authentication agent 228 and the policy storage/enforcement agent 230 may be performed on the server 202, such as, for example, enforcing agreements between the user and the service provider when generating the privacy access policy.

Preventing a client App from accessing private information may cause a side effect to the electronic device that can result in degraded performance or power consumption. For instance, if the client App is merely prevented from accessing the private information, the client App may continue to keep trying to perform the access. This may degrade the ability of the electronic device to perform other tasks as quickly, which may lead to user dissatisfaction with the electronic device. In another example, the client App may receive requests from the provider of the App to poll the private information and transmit the accessed information to a target (e.g., a remote server of the App provider). If the client App does not provide the information, the polling and transmission cycle may continue or may be initiated more frequently. This may increase the normal power consumption of the electronic device leading to more frequent charging. This may also reduce user satisfaction with the electronic device. Additionally, use of the electronic device may be subject to a limited data plan. Repeated transmission by the client App may unnecessarily use up the quota of data without the user being aware of the data access. This can make the repeated polling of the privacy data expensive for the user.

In general, the client App may not be able to handle the type of unusual scenarios or may fail to perform the intended action as a result of the restriction to the privacy data. In these circumstances, the privacy management module 208 may provide artificial data (if so configured as policy by the user) to the client App. The user can be made aware (e.g., via an alert or via the UI) that the client App output data is based on the artificial private information, and that the output may not be precise as when actual privacy data is not provided.

After the user provides new settings via the CBRTAPM UI 236 to generate privacy access policy, the CBRTAPM may work with the platform power and performance managers to monitor and make sure that the new settings don't violate platform power and performance settings or device limitations. If the power settings are violated, the CBRTAPM may present recommendations to the user. These recommendations may include a recommendation to provide artificial data to the client App. The user configures the preferred privacy access policy which is generated and stored in either secure storage 224 if the CBRTAPM is invoked in the device or stored in the server if the CBRTAPM is invoked in the cloud. The policy can then be downloaded to the secure storage 224 of one or more electronic devices. The policy may then be activated immediately, periodically, on-demand, etc., according to policy synchronization settings.

Based on the resulting privacy access policy configured by the user, the privacy management module 208 may provide artificial private information to the client App to reduce attempts by the App to access the stored private information. This artificial information may include, among other things, a false phone number, a false e-mail address, a false social security number or false portion of a social security number, etc. Providing this false private information instead of merely preventing access to the information may reduce power consumption resulting from functions performable by the client App.

In some examples, these functions may include transmission of information from the electronic device. Reducing the frequency with which these function are performed may reduce the energy demand of the device, may reduce the battery drain of a mobile electronic device, and may reduce the data transmission of the electronic device.

Figure 3:
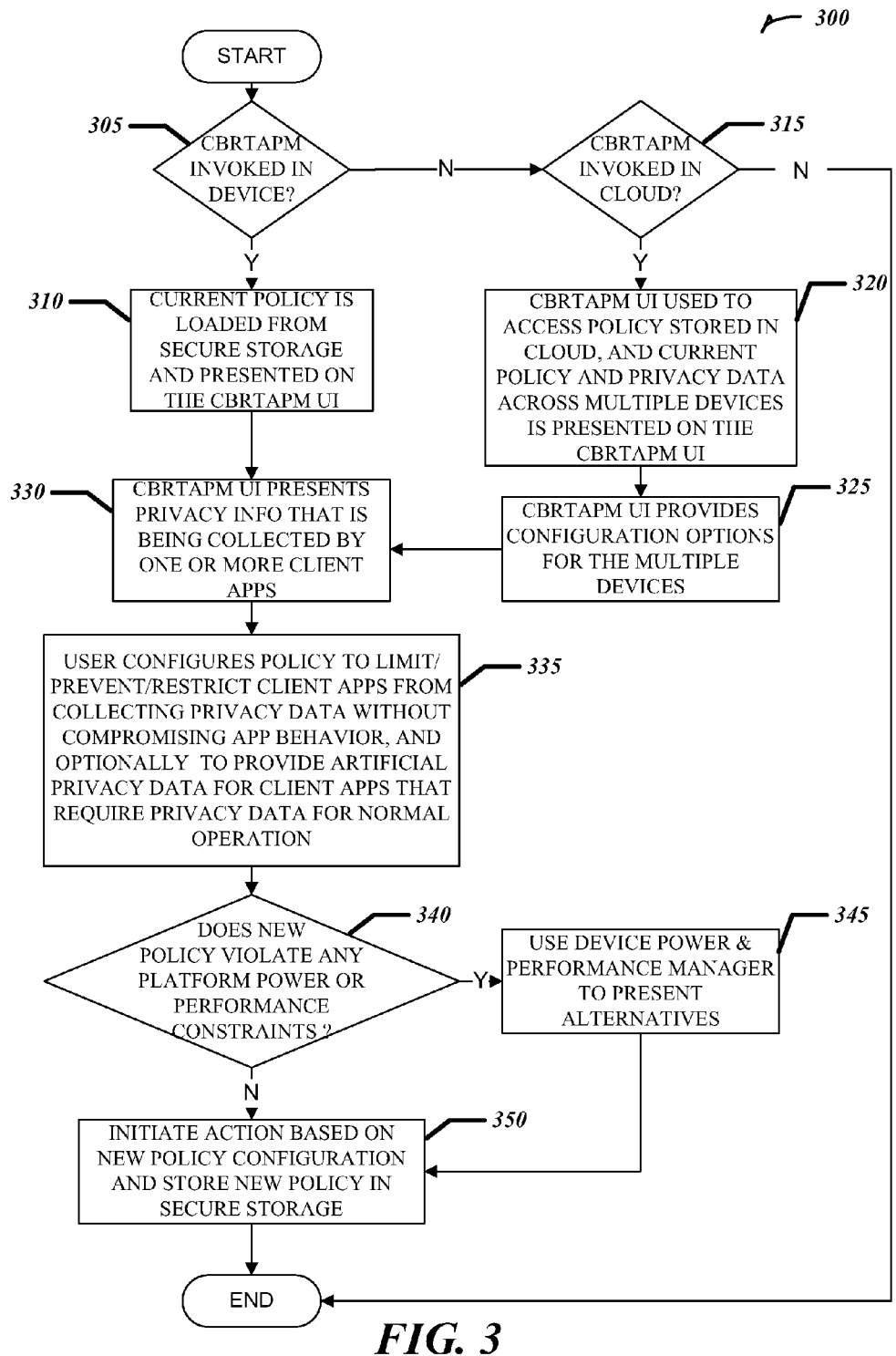
FIG. 3 is a flow diagram illustrating an example of a method of configuring a privacy access policy for an electronic device, according to an embodiment.

FIG. 3 is a flow diagram illustrating an example of a method 300 of configuring a privacy access policy for an electronic device. At block 305 it is determined whether the CBRTAPM is invoked in the electronic device, or at block 315, whether the CBRTAPM is invoked via cloud based services. If it is invoked in the electronic device, at block 310 the current privacy access policy is loaded from secure storage and presented to the user by a CBRTAPM UI.

If it is invoked in the cloud based services, at block 320 the CBRTAPM UI is used to download the current privacy access policy and, if configured to do so, to download privacy data collected from multiple electronic devices that the user manages. At block 325, the CBRTAPM UI is used to provide policy configuration options for the multiple devices.

At block 330, the CBRTAPM UI presents private information that is collected by one or more client Apps in the one or more electronic devices. At block 335, the user configures the privacy access policy to limit, prevent, or otherwise restrict client Apps from collecting private information without compromising the user-observed performance of the client Apps. The user optionally configures the privacy management of an electronic device to provide artificial private information to the client Apps that require some private information to operate normally.

At block 340, privacy management determines if the newly configured policy violates any platform power constraints, performance constraints, or other device limitations on any of the electronic devices. If so, at block 345, privacy management determines alternatives by using or monitoring power and performance managers of the electronic device. At block 350, the newly configured privacy access policy may be stored in secure storage of the electronic devices and actions based on the policy are initiated in the electronic devices.

The methods, devices, and systems described herein provide multiple options for a user to manage the access or attempts to access private information stored in an electronic device. A privacy manager places information management in control of the user which can result in increased user satisfaction with electronic devices.

ADDITIONAL NOTES AND EXAMPLES

Example 1 can include subject matter (such as an apparatus, a method, a means for performing acts, or a machine readable medium including instructions that, when performed by the machine, that can cause the machine to perform acts), such as a server. The server can include a processor and a memory storing executable code as a privacy management module. The executable code includes instructions performable by a remote electronic device, including instructions to detect access to private information stored in memory of the electronic device, wherein the access is performed by a client application program (client App) executing in the electronic device, track the private information being accessed, and reconfigure the mobile electronic device to change the access to the private information by the client App according to at least one privacy access policy stored in the electronic device.

Example 2 can include, or can optionally be combined with the subject matter of Example 1 to include, a client program, executable by the processor of the server, to receive requests to download the executable code via a network to the remote electronic device.

Example 3 can include, or can optionally be combined with the subject matter of one or any combination of Examples 1 and 2 to include, a client program of the server configured to download a user interface to at least one of the electronic device or a separate computing device for display (wherein the user interface provides input to the client program), incorporate input received via the user interface into a privacy access policy generated by the client program of the server, and download the privacy access policy into one or more remote electronic devices.

Example 4 can include, or can optionally be combined with the subject matter of one or any combination of Examples 1-3 to include, a privacy management module that includes instructions to generate the privacy access policy, display an privacy access policy user interface on the electronic device, and incorporate input received via the user interface into the generated privacy access policy.

Example 5 can include, or can optionally be combined with the subject matter of one or any combination of Examples 1-4 to include, a privacy management module that includes instructions to display, via the user interface, types of information accessed by the client App.

Example 6 can include, or can optionally be combined with the subject matter of one or any combination of Examples 1-5 to include, a privacy management module that includes instructions to alter the private information provided to the client App according to the privacy access policy.

Example 7 can include, or can optionally be combined with the subject matter of one or any combination of Examples 1-6 to include, a privacy management module configured to display, via the user interface, an access policy determined according to a licensing agreement associated with the client application program, incorporate licensing information into the privacy access policy stored in the electronic device, and limit access to the private information according to the licensing information.

Example 8 can include, or can optionally be combined with the subject matter of one or any combination of Examples 1-7 to include, a privacy management module that includes instructions to prevent access to at least a portion of the private information by the client App according to the privacy access policy.

Example 9 can include, or can optionally be combined with the subject matter of one or any combination of Examples 1-8 to include, a privacy management module that includes instructions to provide, according to the privacy access policy, artificial private information to the client App to reduce attempts by the client App to access the private information stored in the electronic device.

Example 10 can include, or can optionally be combined with the subject matter of one or any combination of Examples 1-9 to include, a privacy management module that includes instructions to provide, according to the privacy access policy, artificial private information to the client App to reduce the execution of functions, which are performable by the client App, that include transmission of information from the electronic device.

Example 11 can include, or can optionally be combined with the subject matter of one or any combination of Examples 1-10 to include a privacy management module that includes executable code performable by a processor of a cellular telephone.

Example 12 can include subject matter, or can optionally be combined with one or any combination of Examples 1-11 to include subject matter, (such as an apparatus, a method, a means for performing acts, or a machine readable medium including instructions that, when performed by the machine, that can cause the machine to perform acts), such as detecting access to private information stored in memory of the electronic device, wherein the detecting is performed by a privacy management module downloadable to the electronic device as object code for execution on the electronic device, and wherein the access is performed by a client App, tracking, using the privacy management module, the private information being accessed by the client App, and reconfiguring the electronic device, using the privacy management module, to change the access to the private information by the client App according to at least one privacy access policy stored in the electronic device.

Such subject matter can include means for detecting access to private information stored in memory of the electronic device, an illustrative example of which can include a privacy management module downloaded to execute on an electronic device (such as a smartphone, tablet computer, netbook, laptop computer, desktop computer, or television). Such subject matter can include means for tracking the private information being accessed by the client App, illustrative examples of which can include a privacy management module downloaded to execute on an electronic device and a client program executing on a server remote from the electronic device. Such subject matter can include means for reconfiguring the electronic device to change the access to the private information by the client App, illustrative examples of which can include a user interface on the electronic device to interface to the privacy management module, and a user interface on the electronic device to interface with a client program executing on a server remote from the electronic device.

Example 13 can include, or can optionally be combined with the subject matter of Example 12 to include, altering private information provided to the client App according to the access policy.

Example 14 can include, or can optionally be combined with the subject matter of one or any combination of Examples 11-13 to include, preventing access to at least a portion of the private information by the client App according to the access policy.

Example 15 can include, or can optionally be combined with the subject matter of one or any combination of Examples 11-14 to include, generating the privacy access policy using the privacy management module and the electronic device.

Example 16 can include, or can optionally be combined with the subject matter of one or any combination of Examples 11-15 to include, executing the privacy management module to display a policy development user interface on the electronic device and incorporating input received via the user interface into the privacy access policy stored in the electronic device.

Example 17 can include, or can optionally be combined with the subject matter of one or any combination of Examples 11-16 to include, displaying an access policy determined according to a licensing agreement associated with the client App.

Example 18 can include, or can optionally be combined with the subject matter of one or any combination of Examples 11-17 to include, downloading a remote server user interface to at least one of the electronic device or a separate computing device, incorporating input received via the user interface into a privacy access policy generated by the remote server, and downloading the privacy access policy into one or more electronic devices.

Example 19 can include, or can optionally be combined with the subject matter of one or any combination of Examples 11-18 to include, providing artificial private information to the client App to reduce attempts by the client App to access the private information.

Example 20 can include, or can optionally be combined with the subject matter of one or any combination of Examples 11-19 to include, providing artificial private information to the client App to reduce the execution of functions, which are performable by the client App, that include transmission of information from the electronic device.

Example 21 can include, or can optionally be combined with the subject matter of one or any combination of Examples 11-20 to include detecting access to private information stored in memory of a cellular telephone.

Example 23 can include subject matter (such as a system) comprising a server. The server can include a processor and a memory storing executable code as a privacy management module. The executable code includes instructions performable by a remote electronic device, including instructions to detect access to private information stored in memory of the electronic device, wherein the access is performed by a client application program (client App) executing in the electronic device, track the private information being accessed, and reconfigure the mobile electronic device to change the access to the private information by the client application program according to at least one privacy access policy stored in the electronic device. The server also includes a client program, executable by the processor, to receive requests to download the executable code via a network to the remote electronic device.

Example 24 can include, or can optionally be combined with the subject matter of Example 23 to include, a server that includes at least one of an authentication agent and a policy storage/enforcement agent.

Example 25 can include, or can optionally be combined with the subject matter of Example 23 to include, an electronic device. The electronic device can include at least one of an authentication agent and a policy storage/enforcement agent.

Example 26 can include, or can optionally be combined with the subject matter of one or any combination of Examples 23-25 to include, an electronic device having a logging agent configured to log an access by a client application program based on the configured privacy access policy.

Example 27 can include, or can optionally be combined with the subject matter of one or any combination of Examples 23-26 to include a client program configured to download a user interface to at least one of the electronic device or a separate computing device for display, wherein the user interface provides input to the client program, incorporate input received via the user interface into a privacy access policy generated by the client program of the server, and download the privacy access policy into one or more remote electronic devices.

Example 28 can include, or can optionally be combined with the subject matter of one or any combination of Examples 23-27 to include, an electronic device having secure storage to store the privacy access policy and a security engine to implement the policy.

Example 29 can include, or can optionally be combined with any portion or combination of any portions of any one or more of Examples 1-28 to include, subject matter that can include means for performing any one or more of the functions of Examples 1-28, or a machine-readable medium including instructions that, when performed by a machine, cause the machine to perform any one or more of the functions of Examples 1-28.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. In some examples, a carrier medium can carry code implementing the methods. The term "carrier medium" can be used to represent carrier waves on which code is transmitted.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method comprising:
   detecting access to private information stored in memory of an electronic device, wherein the detecting is performed by a privacy management module downloadable to the electronic device as object code for execution on the electronic device, and wherein the access is performed by a client application program;
   tracking, using the privacy management module, types of private information being accessed in the memory by the client application program; and
   reconfiguring the electronic device, using the privacy management module, to change the access to the private information by the client application program according to at least one privacy access policy stored in the electronic device and the types of private information being accessed in the memory;
   presenting, via a user interface, information associated with the access to the private information;
   receiving privacy policy preferences into a privacy management module via a user interface of an electronic device;
   determining whether the received preferences conflict with power constraints of the electronic device;
   presenting, via the user interface, a recommendation to privacy access policy according to the determination; and
   reconfiguring to at least one privacy access policy stored in the electronic device according to the received privacy policy preferences.

2. The method of claim 1, wherein changing access to the private information by the client application program includes altering private information provided to the client application program according to the access policy.

3. The method of claim 1, wherein changing access to the private information by the client application program includes preventing access to at least a portion of the private information by the client application program according to the access policy.

4. The method of claim 1, including generating the privacy access policy using the privacy management module and the electronic device.

5. The method of claim 4, wherein generating the privacy access policy includes:
   executing the privacy management module to display a policy development user interface on the electronic device; and
   incorporating input received via the user interface into the privacy access policy stored in the electronic device.

6. The method of claim 1, including:
   displaying, on the policy development user interface, an access policy determined according to a licensing agreement associated with the client application program;
   incorporating licensing information into the privacy access policy stored in the electronic device; and
   limiting access to the private information according to the licensing information.

7. The method of claim 1, including:
   downloading a user interface to at least one of the electronic device or a separate computing device, wherein the user interface provides input to a remote server;
   incorporating input received via the user interface into a privacy access policy generated by a client program executable by the remote server; and downloading the privacy access policy into one or more electronic devices.

8. The method of claim 1, wherein the privacy access policy includes providing artificial private information to the client application program to reduce attempts by the client application program to access the private information.

9. The method of claim 1, wherein the privacy access policy includes providing artificial private information to the client application program to reduce the execution of functions, which are performable by the client application program, that include transmission of information from the electronic device.

10. The method of claim 1, wherein the electronic device is a cellular telephone.

11. At least one non-transitory computer-readable medium including performable instructions that, when performed by an electronic device as a privacy management module, cause the electronic device to perform a method comprising:
  detecting access to private information stored in memory of an electronic device, wherein the detecting is performed by a privacy management module downloadable to the electronic device as object code for execution on the electronic device, and wherein the access is performed by a client application program;
  tracking, using the privacy management module, types of private information being accessed in the memory by the client application program;
  reconfiguring the electronic device, using the privacy management module, to change the access to the private information by the client application program according to at least one privacy access policy stored in the electronic device and the types of private information being accessed in the memory;
  presenting, via a user interface, information associated with the access to the private information;
  receiving privacy policy preferences into a privacy management module via a user interface of an electronic device;
  determining whether the received preferences conflict with power constraints of the electronic device;
  presenting, via the user interface, a recommendation to privacy access policy according to the determination; and
  reconfiguring to at least one privacy access policy stored in the electronic device according to the received privacy policy preferences.

12. An apparatus comprising:
  a server including a processor and a memory, wherein the memory stores machine-executable code that, when executed by a remote electronic device, implements a privacy management module to:
    detect access to private information stored in memory of the electronic device, wherein the access is performed by a client application program executing in the electronic device;
    track types of private information being accessed in the memory;
    reconfigure the electronic device to change the access to the private information by the client application program according to at least one privacy access policy stored in the electronic device and the types of private information being accessed in the memory;
    display a privacy access policy user interface on the electronic device;
    receive privacy policy preferences via the user interface;
    determine whether the received preferences conflict with power settings of the electronic device;
    present, via the user interface, a recommendation to privacy access policy according to the determination; and
    incorporate input received via the user interface into the generated privacy access policy.

13. The apparatus of claim 12, including a client program, executable by the processor of the server, to receive requests to download the executable code via a network to the remote electronic device.

14. The apparatus of claim 13, wherein the client program of the server is configured to:
  download a user interface to at least one of the electronic device or a separate computing device for display, wherein the user interface provides input to the client program;
  incorporate input received via the user interface into a privacy access policy generated by the client program of the server; and
  download the privacy access policy into one or more remote electronic devices.

15. The apparatus of claim 12, wherein the privacy management module is configured to:
  generate the privacy access policy;
  display a privacy access policy user interface on the electronic device; and
  incorporate input received via the user interface into the generated privacy access policy.

16. The apparatus of claim 12, wherein the privacy management module is configured to display, via the user interface, types of information accessed by the client application program.

17. The apparatus of claim 12, wherein the privacy management module is configured to:
  display, via the user interface, an access policy determined according to a licensing agreement associated with the client application program;
  incorporate licensing information into the privacy access policy stored in the electronic device; and
  limit access to the private information according to the licensing information.

18. The apparatus of claim 12, wherein the privacy management module is configured to alter the private information provided to the client application program according to the privacy access policy.

19. The apparatus of claim 12, wherein the privacy management module is configured to prevent access to at least a portion of the private information by the client application program according to the privacy access policy.

20. The apparatus of claim 12, wherein the privacy management module is configured to provide, according to the privacy access policy, artificial private information to the client application program to reduce attempts by the client application program to access the private information stored in the electronic device.

21. The apparatus of claim 12, wherein the privacy management module is configured to provide, according to the privacy access policy, artificial private information to the client application program to reduce the execution of functions, which are performable by the client application program, that include transmission of information from the electronic device.

22. The apparatus of claim 12, wherein the privacy management module includes executable code performable by a processor of a cellular telephone.

23. A system to manage access of stored information, the system comprising:
a server including: a processor;
a memory, wherein the memory stores machine-executable code that, when executed by a remote electronic device, implements a privacy management module to:
  detect access to private information stored in memory of the electronic device, wherein the access is performed by a client application program executing in the electronic device;
  track types of private information being accessed in the memory;
  reconfigure the electronic device to change the access to the private information by the client application program according to at least one privacy access policy stored in the electronic device and the types of private information being accessed in the memory;
  display a privacy access policy user interface on the electronic device;
  receive privacy policy preferences via the user interface;
  determine whether the received preferences conflict with power settings of the electronic device;
  present, via the user interface, a recommendation to privacy access policy according to the determination; and
  incorporate input received via the user interface into the generated privacy access policy; and
a client program, executable by the processor, to receive requests to download the executable code via a network to the remote electronic device.

24. The system of claim 23, wherein the server includes at least one of an authentication agent and a policy storage/enforcement agent.

25. The system of claim 23, including the electronic device, wherein the electronic device includes at least one of an authentication agent and a policy storage/enforcement agent.

26. The system of claim 25, wherein the electronic device includes a logging agent configured to log an access by a client application program based on the configured privacy access policy.

27. The system of claim 25, wherein the client program is configured to:
  download a user interface to at least one of the electronic device or a separate computing device for display, wherein the user interface provides input to the client program;
  incorporate input received via the user interface into a privacy access policy generated by the client program of the server; and
  download the privacy access policy into one or more remote electronic devices.

28. The system of claim 25, wherein the electronic device includes secure storage to store the privacy access policy and a security engine to implement the policy.

* * * * *